UNITED STATES PATENT OFFICE.

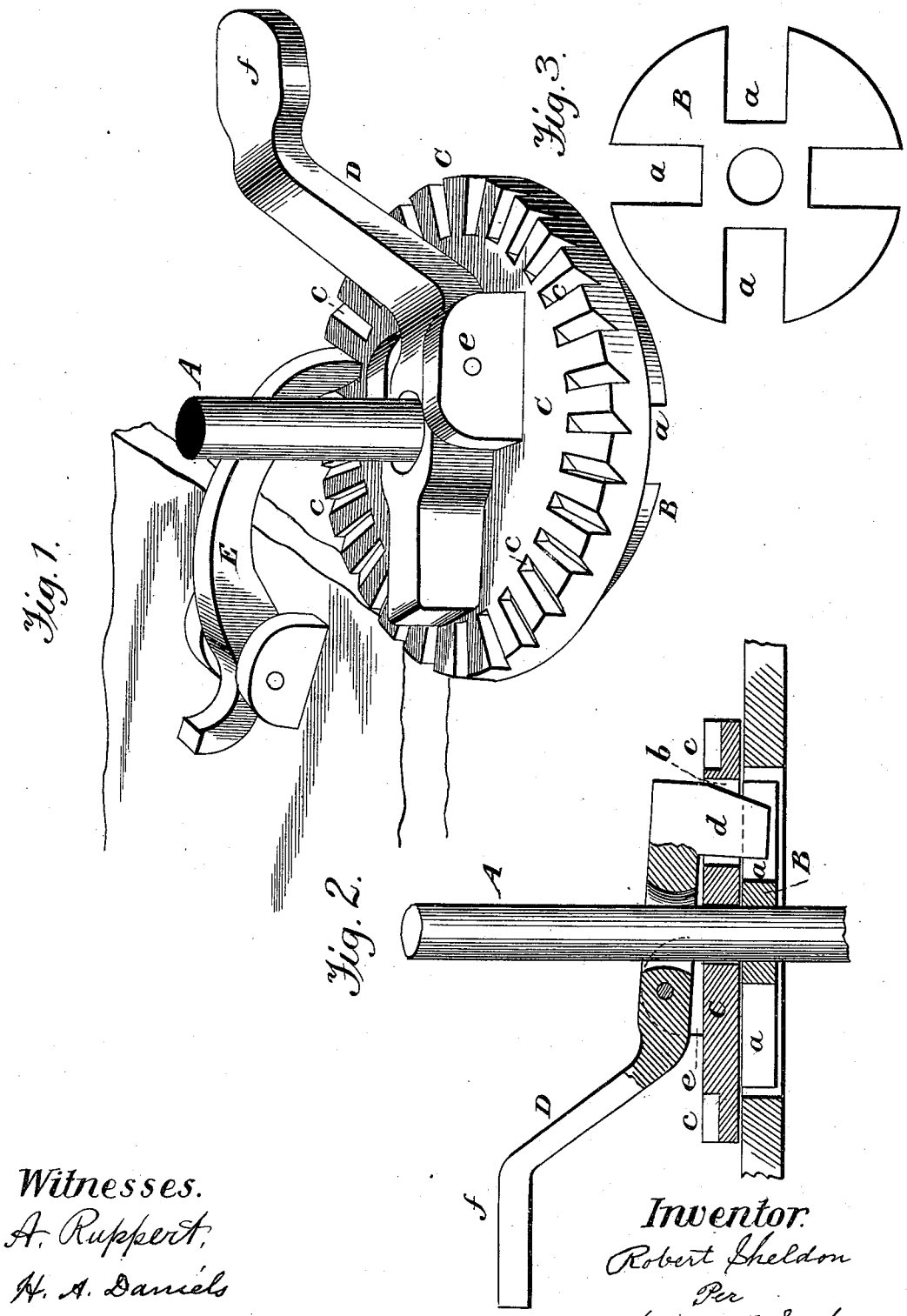

ROBERT SHELDON, OF EAST GREENWICH, RHODE ISLAND.

CAR-BRAKE MECHANISM.

SPECIFICATION forming part of Letters Patent No. 443,871, dated December 30, 1890.

Application filed June 6, 1890. Serial No. 354,520. (No model.)

*To all whom it may concern:*

Be it known that I, ROBERT SHELDON, a citizen of the United States, residing at East Greenwich, in the county of Kent and State of Rhode Island, have invented certain new and useful Improvements in Car-Brake Mechanism; and I do hereby declare the following to be a full, clear, and exact description of the invention, such as will enable others skilled in the art to which it appertains to make and use the same.

This invention relates to car-brake mechanism; and it consists of an improved construction of ratchet and let-off mechanism, as hereinafter described and claimed.

In the accompanying drawings, Figure 1 is a perspective view illustrating my invention. Fig. 2 is a sectional view of wheels and lever connected with the brake-shaft. Fig. 3 is a plan view of the lower wheel, which is fast on the brake-shaft.

A designates the brake-shaft mounted in its usual position at the end of the car and having a wheel B fastened to its lower end. This wheel B is provided with slots or radial openings $a$ for the purpose hereinafter mentioned.

C indicates a wheel which is placed loosely on the shaft A above the wheel B, and is provided on its upper face near the periphery with ratchet-teeth $c$ for connection with a pawl, as hereinafter stated. The wheel C is also provided with an opening $b$, which is in position to register with either of the openings $a$ in the wheel B, when the latter wheel is being rotated independently of the wheel C.

D indicates a foot-lever pivotally mounted in bearings $e$, which are carried by the wheel C. The foot-lever D is loosely connected with the shaft A, which passes through an elongated aperture in said lever, the latter being allowed a rocking movement on its pivot. The said foot-lever is provided at one end with a bolt $d$, which, when in position for operating the brake, extends through the opening $b$ of the wheel C and into one of the openings $a$ in the wheel B, fastened to the brake-shaft, as before stated. The lever D is provided with a raised foot-piece $f$, by means of which the bolt $d$ may be raised from the wheel B, disconnecting the latter from the wheel C.

E indicates a pawl which is pivotally mounted in bearings made fast to the car, the said pawl resting in engagement or being adapted to automatically engage with the ratchet-teeth $c$ of the wheel C.

As will be seen, the locking-lever D falls into position, connecting the wheels B and C, and as the operator turns the brake-shaft to close the brake the pawl E prevents any backward movement by its engagement with the teeth $c$ on the wheel C. When the brakeman desires to let off the brake, he presses down the foot-piece of the lever D with his foot, thus raising the lever from connection with the lower wheel B.

I claim—

1. The combination, with the brake-shaft of a car-brake, of a lower wheel provided with slots or radial openings and fastened to said shaft, an upper wheel loose on said shaft and provided with ratchet-teeth on its upper face and an opening adapted to register with one or more openings in the first mentioned wheel, a pivoted lever mounted on said upper wheel and adapted to automatically connect both of said wheels, and a pivoted pawl adapted to connect by gravity with said upper wheel, substantially as and for the purposes described.

2. The brake-shaft of a car-brake, provided with a slotted wheel B, fastened to said shaft, in combination with a wheel C, which is loose on said shaft and is provided with an opening $b$ and ratchet-teeth $c$, a pivoted lever D, mounted on wheel C and provided with a bolt $d$ in position to connect with wheel B through opening $b$, and a pivoted pawl E in position to connect with the wheel C, substantially as set forth and described.

In testimony whereof I have affixed my signature in presence of two witnesses.

ROBERT SHELDON.

Witnesses:
JAMES FAULY,
BENJAMIN POTTER.